Aug. 30, 1938.                W. OWEN                  2,128,714
                        MIRROR PLATING APPARATUS
                         Filed Aug. 13, 1937         6 Sheets-Sheet 1
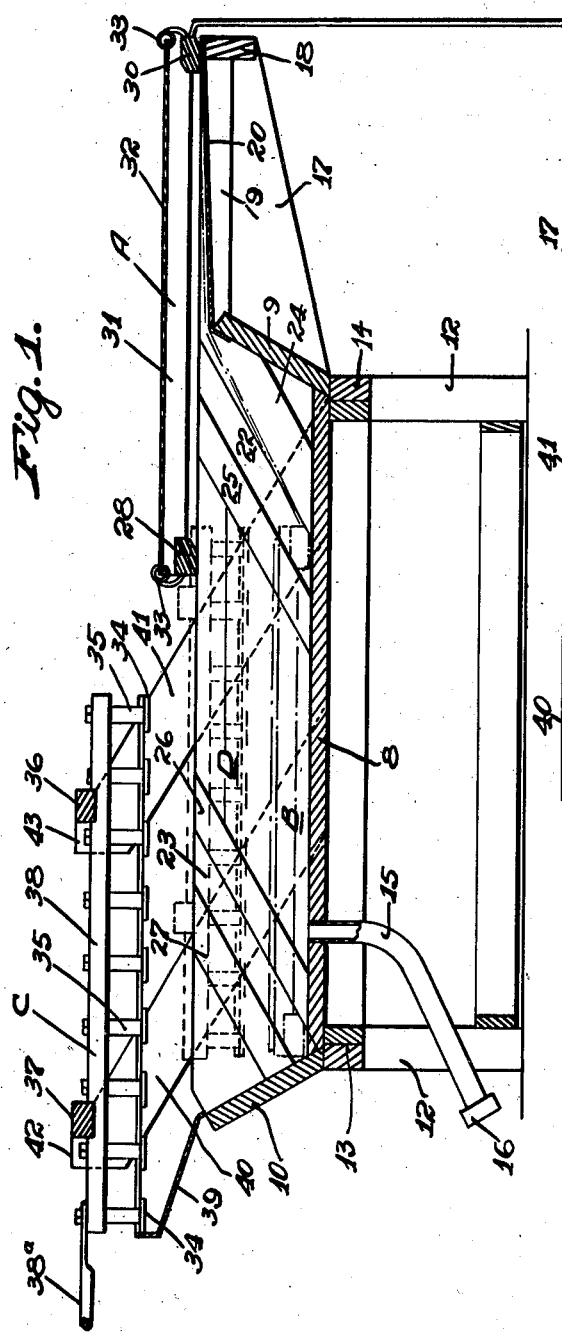
INVENTOR
WILLIAM OWEN
BY Bradley & Bee
ATTORNEYS.

Aug. 30, 1938.  W. OWEN  2,128,714
MIRROR PLATING APPARATUS
Filed Aug. 13, 1937   6 Sheets-Sheet 2
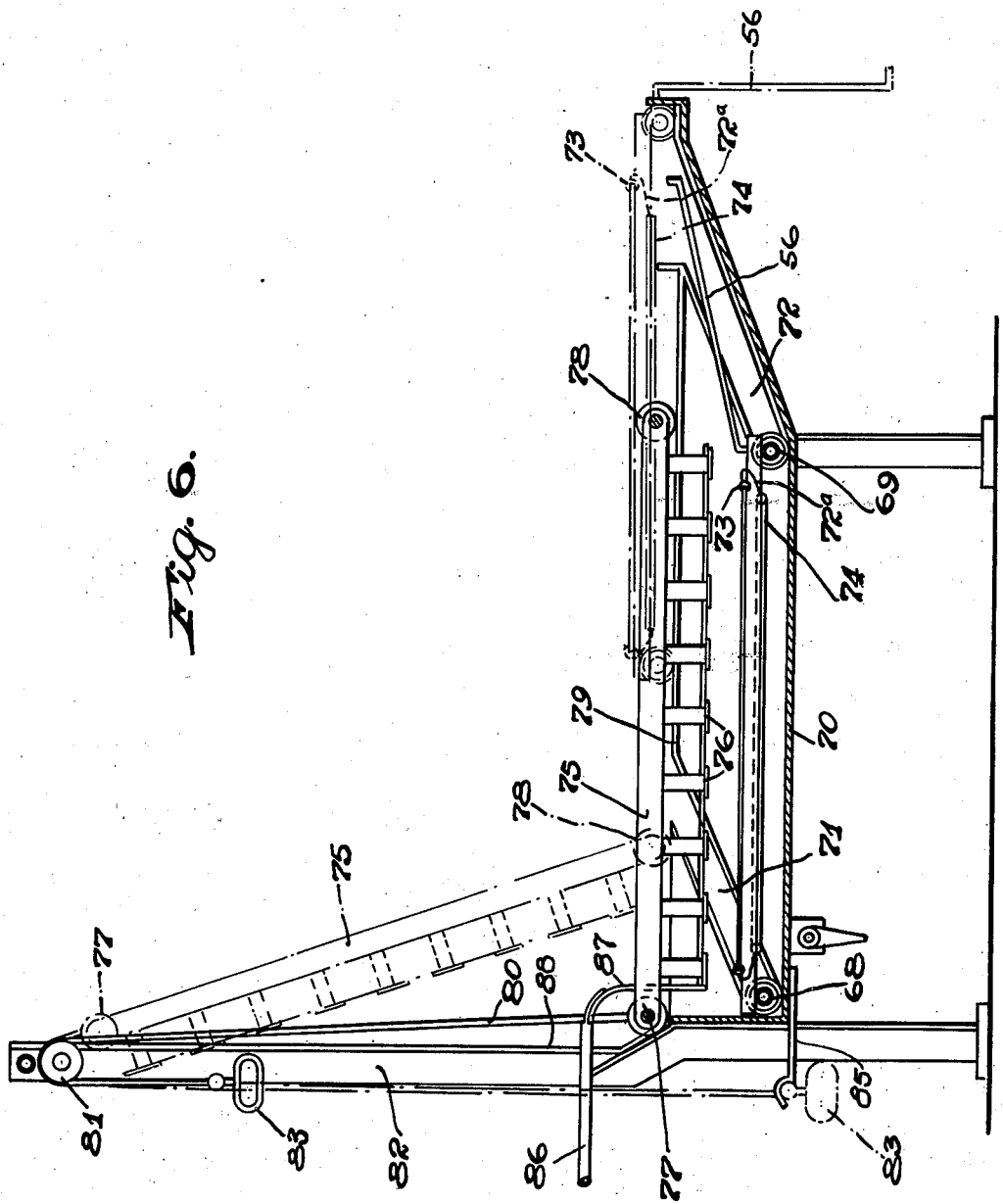
INVENTOR
WILLIAM OWEN
BY Bradley & Bee
ATTORNEYS.

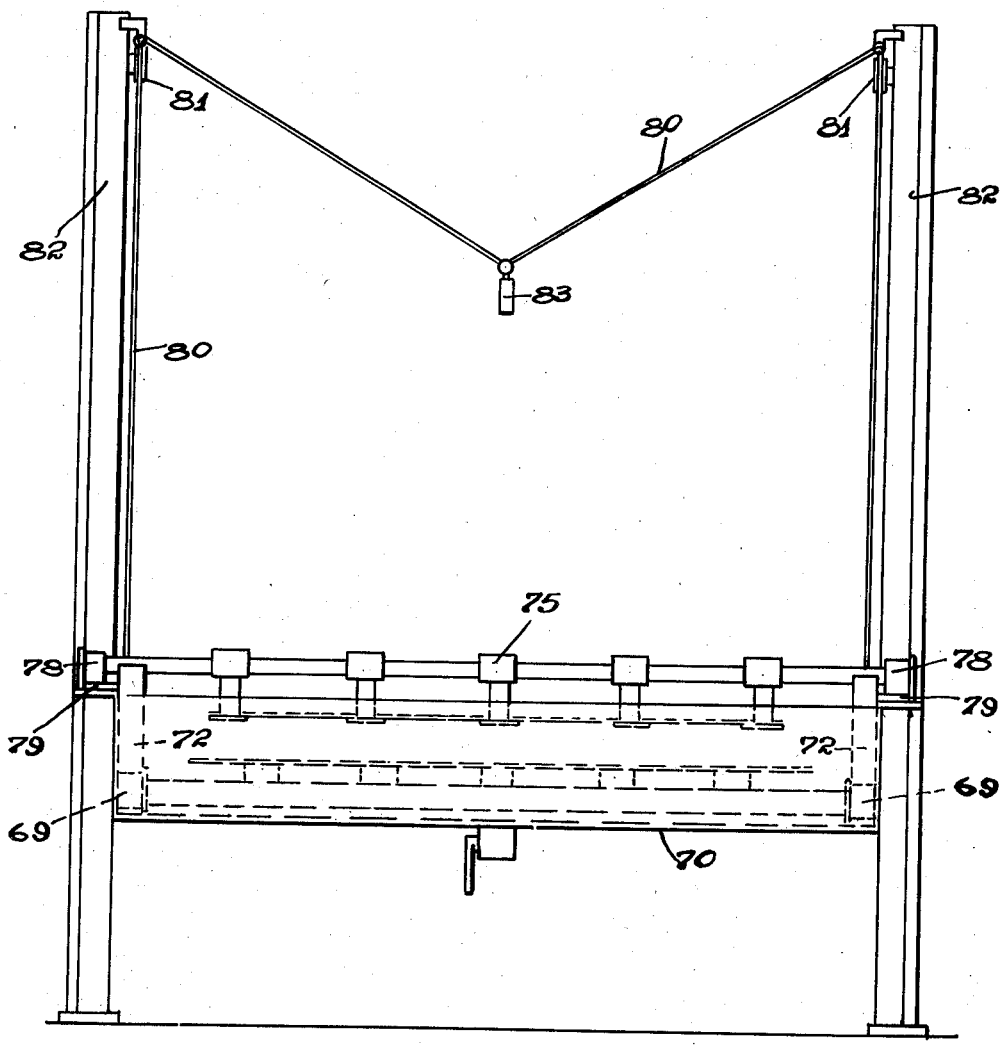

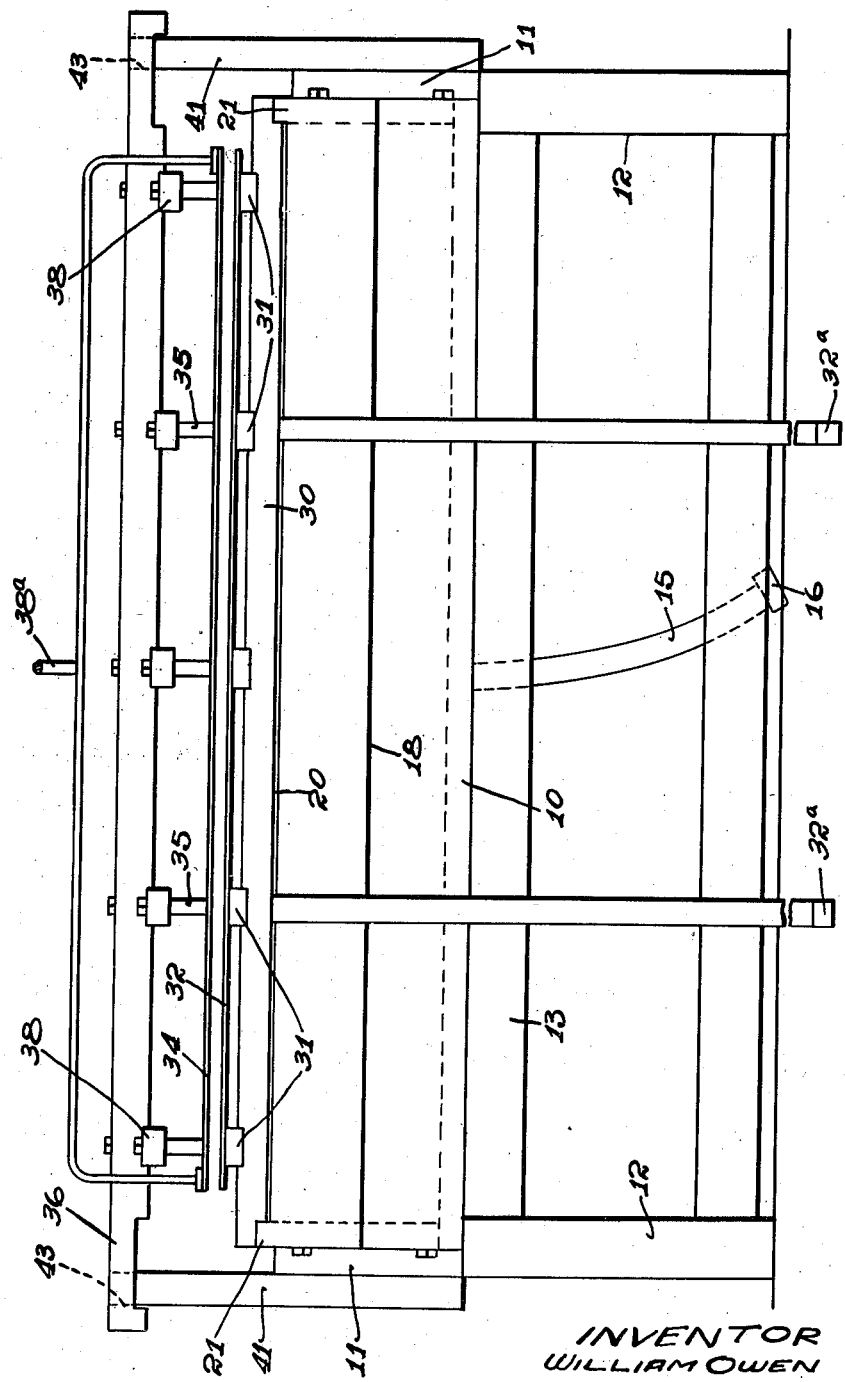

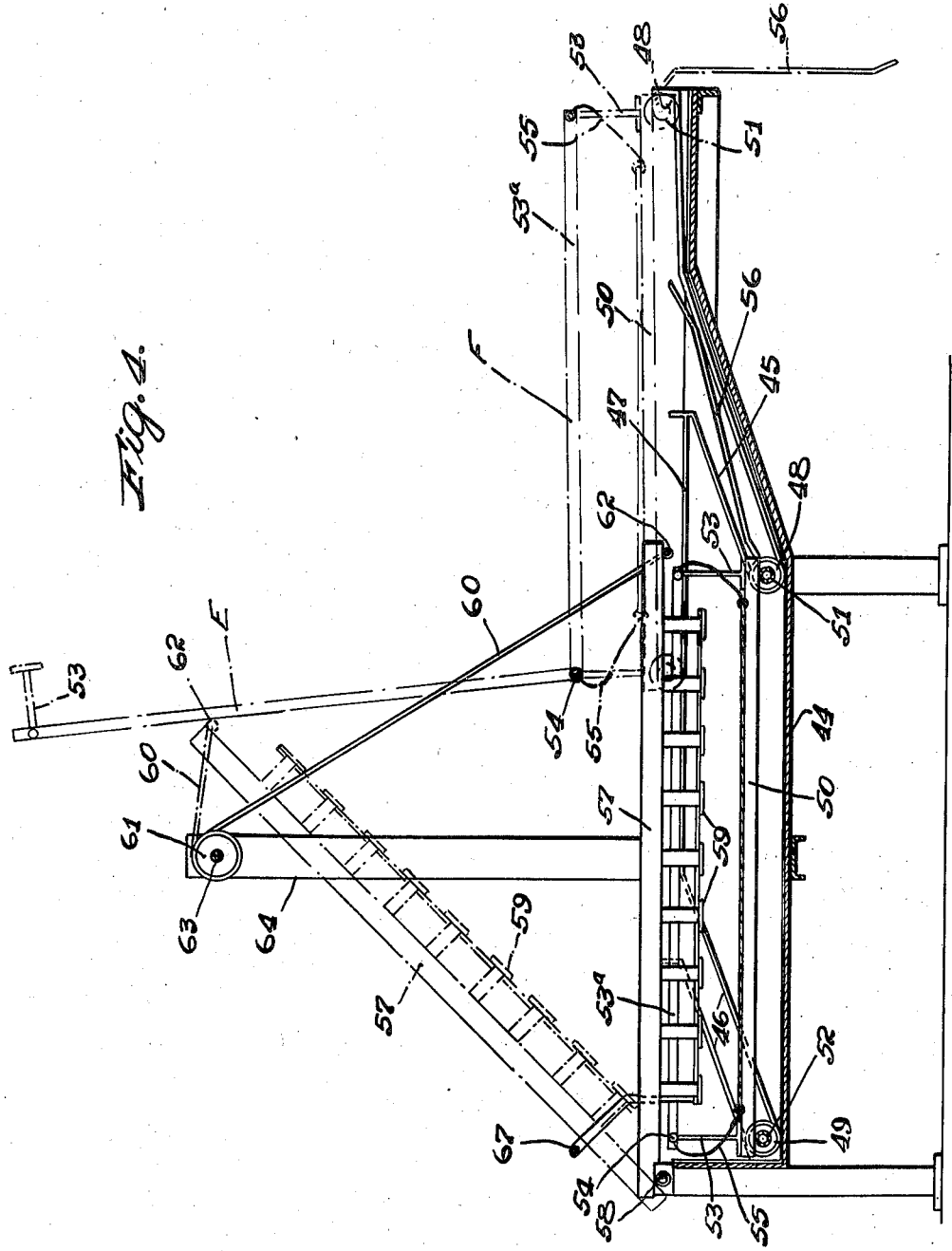

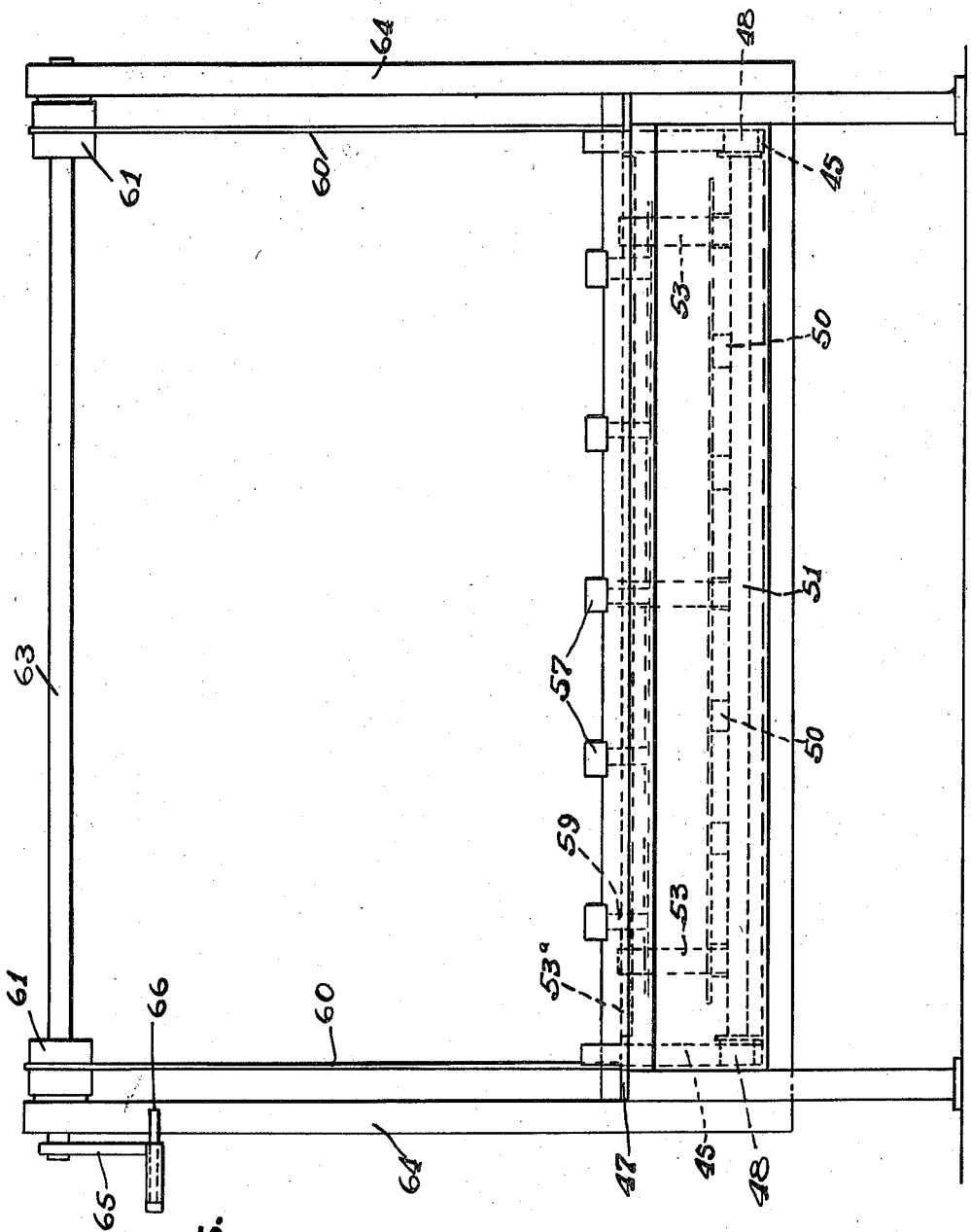

Patented Aug. 30, 1938

2,128,714

UNITED STATES PATENT OFFICE 2,128,714

MIRROR PLATING APPARATUS

William Owen, Pittsburgh, Pa., assignor to Pittsburgh Plate Glass Company, Allegheny County, Pa., a corporation of Pennsylvania Application August 13, 1937, Serial No. 158,920

5 Claims. (Cl. 205—5)

The invention relates to apparatus for electroplating the silvered surfaces of mirrors, ordinarily with copper, although there is no limitation in this respect in so far as the use of the apparatus is concerned, since other metals may be deposited electrolytically. The invention has for its primary objects the provision of improved apparatus for carrying out the plating operation with the mirror plates in horizontal position with the silvered surfaces on the upper faces of the glass sheets, which is of cheap simple construction permitting of the ready shifting of the glass plates into and out of the tank. A further object is the provision of improved apparatus of the type specified which can be operated without injury to the metallic films on the plates and without danger of breaking the plates. Certain embodiments of the invention are illustrated in the accompanying drawings, wherein:

Figure 1 is a longitudinal vertical section through the tank and its equipment. Fig. 2 is a plan view of the tank with the equipment removed. Fig. 3 is an end elevation of the apparatus. Figs. 4 and 5 show a modification, Fig. 4 being a section similar to that of Fig. 1 and Fig. 5 an end elevation. And Figs. 6 and 7 show still another modification, Fig. 6 being a section similar to that of Fig. 1 and Fig. 7 an end elevation.

Referring to Figs. 1 to 3, the tank is of the horizontal type comprising the bottom wall 8, the end walls 9 and 10 and the side walls 11, 11, suitably secured together and resting upon the base made up of the legs 12 and cross members 13 and 14. A drain pipe 15 is provided having a closure cap 16.

Extending from one end of the tank is a rack support comprising the members 17, 17 constituting extensions of the side walls of the tank tied together at their ends by the cross member 18, with a strip 19 (Fig. 2) between the member 18 and the end wall of the tank. A rubber sheet 20 covers the upper face of the support and serves to conduct drainage back into the tank.

Secured to the inner faces of the side walls 11, 11 of the tank are a pair of strips 21, 21 which act as guides for the glass supporting rack later described. Leading downwardly from each of the guides is a pair of inclined guide slots 22, 23 formed by nailing the strips 24, 25, 26 and 27 to the inner faces of the walls 11. These are for guiding the glass rack to the bottom of the tank while it is maintained in a horizontal position.

The rack which carries the silvered plates which are to be plated is shown at A in loading position in full lines in Fig. 1, and in plating position at B in dotted lines. It consists of two cross bars 28, and 30 with their ends rabbeted to fit the guides 21, 21 and longitudinal members 31 (Fig. 3) secured to the upper sides of the bars on which the glass plates 32 rest with their silvered surfaces up. The end bar 30 is provided with a pair of flexible handles 32a for pulling the rack out of the bath. After the rack is loaded, it is pushed to the left (Fig. 1) along the guides 21, 21 until the bar 28 reaches the upper end of the guide slots 23 and the bar 30 reaches the slot 22, and on a further movement of the rack to the left, it follows the inclined groove guides to the dotted line plating position B at the bottom of the bath. After the plating operation, the movement of the rack is reversed and it is pulled to the right, thus moving out of the bath and then onto the rack support where it is unloaded. In both of these movements, the rack is maintained in horizontal position throughout. In the movement of the rack out of the bath, the buoyancy of the rack acts to reduce the labor of moving it up the inclined guides. Any drainage from the rack and glass plates carried thereby is caught by the rubber sheet 20 and conducted back into the bath. Current is conducted to the silvered surfaces of the sheets by means of contact clips 33 and wires carried on the rack and connected to suitable supply leads in a manner well known in the plating art.

The anode, which is also movable into and out of the bath by a method similar to that for handling the glass rack, comprises a series of flat copper strips 34 secured to a suitable frame of wood or the like by means of spacing and securing posts 35. The frame is made up of a pair of cross bars 36 and 37 and a plurality of longitudinal strips 38 which carry the posts. The metal strips are connected at their ends to a suitable supply lead 38a and a rubber sheet is provided as shown at 39 for conducting any drainage from the frame when in elevated position back into the tank. The frame and anode carried thereby are shown in up position in full lines at C in Fig. 1 and in plating position D in dotted lines.

The anode frame is moved into and out of operative position on pairs of inclined guide strips 40 and 41 secured to the outer sides of the tank walls 11, 11. The ends of the cross bars 36 and 37 are rabbeted to fit the guide strips, as indicated in Fig. 3, and in upper position rest against the stop shoulders 42 and 43. When the frame is moved to the right (Fig. 1) from full line position, the anode is lowered into the bath, as indicated in dotted lines, and the ends of the cross bars 36 and 37 rest on the guides 21, 21. When in upper or inoperative position, clearance is provided for the movement of the rack carrying the glass sheets into and out of the bath as will be apparent from inspection. The movements, as provided by the guides, are such that there is no danger of breakage or injury to the metallic films on the glass plates and the amount of effort required to shift the rack and anode is relatively small, so that any requirement for power shifting means is avoided and a cheap, simple construction is possible.

In the construction of Figs. 4 and 5, the tank 44 is of metal instead of wood or composition, and is lined with rubber to protect the metal from the electrolyte. The inclined guides 45 and 46 are in the form of metal strips secured to the sides of the tank and of a composition, such as nickel chromium, which will resist the action of the bath. The metal strips follow the upper edges of the side walls of the tank, as indicated at 47, to provide a track for the pairs of wheels 48 and 49 of the glass carrying rack. This rack consists of the series of bars 50 secured at their ends to a pair of pipes 51 and 52, on which the wheels 48 and 49 are journalled. The rack is, in this case, provided at its corners with the posts 53 which support a light metal frame 53a pivoted at 54, so that it may be swung up to the dotted line position E of Fig. 4, while the rack is being loaded. The leads for supplying current are connected to this frame and when it is swung down to the horizontal position F, connections are made to the glass plates by means of wires 55 provided with suitable clips and connected to the frame. The operation of moving the rack with the glass sheets thereon is the same as heretofore described in connection with Figs. 1 to 3, the handle 56 pivoted to the pipe 51 serving to move the rack along its guides, and when in the vertical position shown in dotted lines in Fig. 4, acts to prevent any accidental movement of the rack to the left. The use of the wheels on the rack makes it somewhat easier to shift back and forth between plating and loading positions than is the case in the Figs. 1 to 3 construction, wherein the rack slides on its tracks or guides.

The anode frame 57 is in this type of apparatus similar to that of the construction of Figs. 1 to 3, but is pivoted to the tank at 58 and when in raised position assumes the position indicated in dotted lines. It carries the anode strips 59 and is raised and lowered by the cables 60, 60 attached to drums 61, 61 at one end and to the rack frame at 62 at the other end. The drums are mounted on a shaft 63 journalled in the uprights 64, 64 secured to the sides of the tank. A suitable handle 65 is provided on the shaft for rotating it, and a slide bolt 66 (Fig. 5) in such handle engages the side of one of the uprights and serves to lock the handle against rotation when the frame is in elevated position. A lead 67 carried by the frame and connected to the anode bars provides for the supply of current. Aside from the method of raising and lowering the anode frame, the operation of the apparatus parallels that of the Figs. 1 to 3 construction.

Figs. 6 and 7 illustrate a modification which is similar to that of Figs. 5 and 6 in so far as the general structure of the glass rack and its guides are concerned. The rack is provided with the pairs of wheels 68 and 69 riding along the tracks at the top of the tank 70 and along the inclined metal guide slots 71 and 72. The frame 53a of the Figs. 4 and 5 construction is not employed here, the connections 72a with their clips 73 being secured to buss bars 74, to which current is supplied through suitable leads.

The anode frame 75 carries the anode bars 76 and is provided with a pair of wheels 77 and 78 at each end riding on the tracks 79 at the upper and the side edges of the tank. It is mounted so that it may be moved along the tracks to the left (Fig. 6) from the full line position and lifted to the inclined position shown in dotted lines, suitable tackle being provided for accomplishing this movement. The tackle comprises a pair of cables 80, 80 attached to the left hand end of the frame and passing over the sheaves 81 journalled at the upper ends of the uprights 82 whose lower ends act as a pair of legs for supporting the end of the tank. The cables are attached at their ends to the handle 83. When this handle is moved to its lower dotted line position by the operator, the anode frame is lifted to its inclined dotted line position, thus providing the necessary clearance above the tank for the movement of the glass carrying rack into and out of the bath. When the anode rack is in its raised inclined position, it is secured against movement back to the horizontal by the bracket 85 whose forked end fits over the handle 83. On releasing the handle, the anode frame moves down by gravity to the operative horizontal position shown in full lines under the control of the operator who retains his grasp upon the handle until the frame is lowered. Suitable electrical connections are made with the anode bars by means of the bracket 87 and lead 86. In moving from horizontal position to the upright position shown in dotted lines, the wheels at the left hand end of the anode frame ride upon the guides 88 on the front sides of the uprights 82.

What I claim is:

1. In combination in apparatus for electroplating glass sheets having metallic reflecting coatings thereon, a horizontal tank for the electroplating bath, a rack support extending horizontally from one end of the tank at the upper edge thereof, a pair of inclined parallel guideways at each end of the tank leading from the bottom of the tank to the upper side edges thereof, horizontal guideways along the side edges of the tank and of the rack support forming continuations of the inclined guideways, and a rack for carrying the glass sheets mounted for movement along the guideways and adapted to be maintained thereby in a substantially horizontal position in its movements between the rack support and the lower ends of the inclined guideways.

2. In combination in apparatus for electroplating glass sheets having metallic reflecting coatings thereon, a horizontal tank for the electroplating bath, a rack support extending horizontally from one end of the tank at the upper edge thereof, a pair of inclined parallel guideways at each end of the tank leading from the bottom of the tank to the upper side edges thereof, horizontal guideways along the side edges of the tank and of the rack support forming continuations of the inclined guideways, a rack for carrying the glass sheets mounted for movement along the guideways and adapted to be maintained thereby in a substantially horizontal position in its movements between the rack support and the lower ends of the inclined guideways, a flat anode frame supported movably in horizontal position on the tank and having an anode on its lower side beneath the level of the bath, means carried by the tank for supporting the frame at an elevated position with the anode remote from the bath, and means for guiding the frame in its movement between the two positions.

3. In combination in apparatus for electroplating glass sheets having metallic reflecting coatings thereon, a horizontal tank for the electroplating bath, a rack support extending horizontally from one end of the tank at the upper edge thereof, a pair of inclined parallel guideways at each end of the tank leading from the bottom of the tank to the upper side edges thereof, horizontal guideways along the side edges of the tank and of the rack support forming continuations of the inclined guideways, a rack for carrying the glass sheets mounted for movement along the guideways and adapted to be maintained thereby in a substantially horizontal position in its movement between the rack support and the lower ends of the inclined guideways, an anode frame carrying an anode on its lower side, and inclined guideways for such frame at the sides of the tank lying transversely of the inclined guideways in the tank which carry the rack and adapted to maintain the anode frame in a substantially horizontal position in its movement from the lower position, in which the anode lies in the tank, to its upper position, in which the anode lies above the tank, adjacent the end thereof which is remote from the end at which the rack support is mounted.

4. In combination in apparatus for electroplating glass sheets having metallic reflecting coatings thereon, a horizontal tank for the electroplating bath, a rack support extending horizontally from one end of the tank at the upper edge thereof, a pair of inclined parallel guideways at each end of the tank leading from the bottom of the tank to the upper side edges thereof, horizontal guideways along the side edges of the tank and of the rack support forming continuations of the inclined guideways, a rack for carrying the glass sheets mounted for movement along the guideways and adapted to be maintained thereby in a substantially horizontal position in its movements between the rack support and the lower ends of the inclined guideways, and an anode frame carrying an anode on one side pivotally mounted at the end of the tank remote from the rack support for movement from a horizontal position with the anode in the bath to an upright position above the tank.

5. In combination in apparatus for electroplating glass sheets having metallic reflecting coatings thereon, a horizontal tank for the electroplating bath, a rack support extending horizontally from one end of the tank at the upper edge thereof, a pair of inclined parallel guideways at each end of the tank leading from the bottom of the tank to the upper side edges thereof, horizontal guideways along the side edges of the tank and of the rack support forming continuations of the inclined guideways, a rack for carrying the glass sheets mounted for movement along the guideways and adapted to be maintained thereby in a substantially horizontal position in its movements between the rack support and the lower ends of the inclined guideways, an anode frame carrying an anode on one side and provided at its ends with rollers, a track extending along the side edges of the tank on which said rollers rest when the anode frame is in horizontal position with the anode in the bath, an upright track at the end of the tank remote from the rack supported adapted to engage the rollers at one end of the anode frame, and tackle at the upper end of the upright track for lifting the end of the anode frame adjacent thereto so that rollers move along the tracks until the anode frame is in upright position.

WILLIAM OWEN.